United States Patent [19]

Odate et al.

[11] 4,064,099

[45] Dec. 20, 1977

[54] THERMOPLASTIC RESIN COMPOSITION HAVING A PEARLY LUSTER

[75] Inventors: Ryoji Odate, Yokohama; Kazuo Haneda, Ageo, both of Japan

[73] Assignee: Shiseido Company, Ltd., Tokyo, Japan

[21] Appl. No.: 584,675

[22] Filed: June 6, 1975

[30] Foreign Application Priority Data

June 6, 1974   Japan ................................ 49-64349
Oct. 8, 1974   Japan ................................ 49-115896

[51] Int. Cl.² .......................... C08L 33/20; C08K 7/14
[52] U.S. Cl. .............................. 260/42.18; 260/876R; 260/893; 260/898
[58] Field of Search .............. 260/876, 898, 42.18, 260/893

[56] References Cited

U.S. PATENT DOCUMENTS 3,022,210   2/1962   Philipps ................................ 156/180
3,655,829   4/1972   Ronzoni et al. ...................... 260/876

FOREIGN PATENT DOCUMENTS 1,250,117   9/1967   Germany ......................... 260/42.18
46-38700   1971   Japan.
994,924   10/1962   United Kingdom ................. 260/876

*Primary Examiner*—Carman J. Seccuro
*Attorney, Agent, or Firm*—Sughrue, Rothwell, Mion, Zinn and Macpeak

[57] ABSTRACT

A thermoplastic resin composition having a pearly luster essentially comprising about 30 to 70% by weight of a polymethyl methacrylate and about 70 to 30% by weight of a styreneacrylonitrile copolymer having an acrylonitrile content of about 25 to 32% by weight. By adding glass fibers to the thermoplastic resin composition, the pearly luster thereof can be further improved and by adding an acrylonitrile-butadiene-styrene resin to the thermoplastic resin composition, the Izod impact value of the resin composition can be increased.

7 Claims, 6 Drawing Figures

THERMOPLASTIC RESIN COMPOSITION HAVING A PEARLY LUSTER

BACKGROUND OF THE INVENTION

1. Field of the Invention

The present invention relates to a thermoplastic resin composition having a pearly luster prepared by mixing polymethyl methacrylate (hereinafter, "PMMA") and a styrene-acrylonitrile copolymer (hereinafter, "AS resin") and, more particularly, it relates to a thermoplastic resin composition having a pearly luster comprising the AS resin in specific proportions and with the AS resin having a particular acrylonitrile content.

The invention relates further to a thermoplastic resin composition having a pearly luster comprising the above-mentioned resin composition having glass fibers added thereto.

Still further, the invention relates to a thermoplastic resin composition having a pearly luster comprising the above described mixture of PMMA and the AS resin and additionally an acrylonitrile-butadiene-styrene resin (hereinafter, "ABS resin").

2. Description of the Prior Art

For providing a thermoplastic resin with a pearly luster, a method is known wherein scaly flakes, basic lead carbonate, a mica pearling agent, etc., is dispersed by kneading in the resin (for example, as disclosed in Japanese Patent Publication No. 12,174/'73). However, the use of these pearling agents as described above is accompanied by difficulties in that the resin is discolored by the extent of kneading of the pearling agent or by heating at processing or the pearly luster appearance is superficial and a so-called deep pearly effect is not obtained since the pearling agent appears only on the surface of the resin at molding or shaping the resin.

On the other hand, an attempt to use a polycarbonate as a material for providing a pearly luster as described in, for example, Japanese Patent Publication Nos. 12,284/'73 and 16,063/'72, an attempt to mix a methacrylic resin, the AS resin, and a styrene resin as described in Japanese Patent Publication No. 38,700/'71, and an attempt to mix an acrylic resin and a styrol resin as described in Japanese Patent Publication No. 30,909/'72 have been recently proposed. However, the attempt to employ a polycarbonate is accompanied by the disadvantages that polycarbonate itself is expensive and although the resin composition has an excellent mechanical strength, the molding conditions are restricted, while the attempt to simply mix acrylic resin and a styrol resin does not provide high strength. Furthermore, in mixing a methacrylic resin, AS resin, and styrene resin, the components are difficult to mix uniformly, the mechanical strength becomes weak depending on their mixing ratio, and further a peeling phenomenon depending on the mixing ratio and the molding conditions tends to occur with this resin composition.

As another example, a mixture of a polyacrylic resin, a polyamide resin or a denatured rubber-like polymer, and a polystyrene resin has been proposed as described in Japanese Patent Publication No. 34,907/'71 but, although such a resin may exhibit a pearly effect, the resin has poor mechanical strength (an Izod impact value of about 1.0–1.6 Kg.-cm./cm$^2$) and thus such a resin cannot be used for purposes requiring high mechanical strength such as, for example, as a hinge for a cosmetic container, e.g., a powder compact, etc., or the resin composition does not exhibit a good pearly effect according to the mixing ratio of the resin components.

SUMMARY OF THE INVENTION

According to the present invention, there is provided a thermoplastic resin composition having a pearly luster without the use of any pearling agents. That is, the thermoplastic resin composition of this invention comprises fundamentally about 30 to 70% by weight of a polymethyl methacrylate (PMMA) and about 70 to 30% by weight of a styrene-acrylonitrile copolymer (AS resin) having an acrylonitrile component of about 25 to 32% by weight.

According to another embodiment of this invention, there is provided a thermoplastic resin composition having a more improved pearly luster comprising the above-described resin composition and additionally glass fibers.

Also, according to still another embodiment of this invention, there is provided a thermoplastic resin composition having a high Izod impact value comprising the above-described resin composition and additionally an ABS resin.

DETAILED DESCRIPTION OF THE INVENTION

Figure 1:
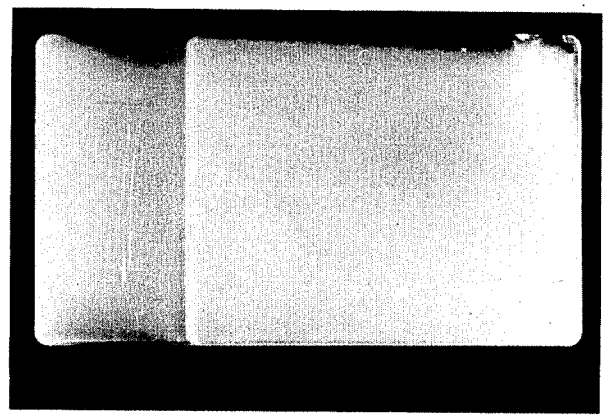
FIGS. 1, 2, and 3 show the relationships between the surface luster effects of resin compositions and the mixing ratios of their components.

In the present invention, the fundamental components of the thermoplastic resin composition are two components as described above and they can be mixed quite easily. Furthermore, the resin composition of this invention can be colored, as desired, by adding dyes or pigments thereto and also the cost thereof is low as compared with conventional resin compositions containing a polycarbonate as a necessary component.

The fundamental components of the thermoplastic resin composition of this invention as described above are PMMA and the AS resin and the compounding ratio of these components is about 30 to 70% by weight, preferably about 40 to 60% by weight, of PMMA and about 70 to 30% by weight, preferably about 60 to 40% by weight, of the AS resin. That is, when the compounding ratio of both components is not within the above-described range, the desired pearly luster effect is not obtained or the pearly luster effect is poor.

There is no particular limitation on the PMMA used in this invention but PMMA having a melt flow rate (measured according to ASTM D 1238, load 2,160 g., temperature: 230° C.) of about 0.7 to 7.3 g./10 min., preferably 2.0 to 7.3 g/10 min., is preferably used.

The AS resin used in this invention has an acrylonitrile content of about 25 to 32% by weight, preferably 27 to 30% by weight. If the acrylonitrile content in the AS resin is lower than about 25% by weight, the mixed resin composition becomes transparent and thus a good pearly luster is not exhibited. On the other hand, if the acrylonitrile content is higher than about 32% by weight, the AS resin has poor compatibility with the PMMA and thus the formation of strain at molding or shaping of the thermoplastic resin composition occurs, which reduces the mechanical strength of the product.

When glass fibers are incorporated in the above-described thermoplastic resin composition according to a second embodiment of this invention, the glass fibers thus incorporated may initially disturb the stream of the resin composition at extrusion molding and injection molding but the glass fibers form a regular stream oriented along the direction of the stream of the resin composition due to the injection force to increase further the pearly luster, whereby the molded resin composition product exhibits a superior pearly luster. In this case, glass fibers having a mean fiber length of about 6 to 25 mm. and a mean fiber diameter of about 9 to 16 $\mu$ are preferably used. The amount of glass fibers employed is usually about 0.05 to 2.0% by weight to the total amount of the above-described resin composition but the most desirable result or pearly luster is obtained using an amount of from about 0.1 to 1.5% by weight.

In general, addition of glass fibers to a thermoplastic resin composition has been attempted in an amount of about 10 to 20% by weight for increasing the mechanical strength of the resin but in the present invention the glass fibers are added to the thermoplastic resin composition for improving the pearly luster and the amount of glass fibers added as described above is much lower than that previously employed. If the amount of glass fibers used is lower than about 0.5% by weight, an improvement in the pearly luster by the addition of the glass fibers is not obtained and if the amount of glass fibers is above about 2.0% by weight, the pearly luster of the resin composition is somewhat reduced by the glass fibers.

Furthermore, by adding the ABS resin to the above-described resin composition of PMMA and the AS resin according to a still further embodiment of this invention, the mechanical strength of the resin composition obtained can be greatly increased to, e.g., an Izod impact value of about 2.8 to 14 Kg-cm/cm$^2$ (ASTM D-256, $\frac{1}{4}$ inch thick). If the Izod impact value of the resin composition is lower than about 2.8 Kg-cm/cm$^2$, the resin composition has insufficient bending strength and the resin composition is unsuitable for practical use, e.g., it cannot be used as a hinge for cosmetic containers such as a powder compact, etc. On the other hand, if the Izod impact value is higher than about 14.0 Kg-cm/cm$^2$, the surface luster, the pearly luster of the resin composition, tends to be poor.

There are no particular limitations on the ABS resin used in this invention but it is desirable to use an ABS resin having an Izod impact value (ASTM D-256, $\frac{1}{4}$ inch thick) of higher than about 20 Kg-cm/cm$^2$, particularly of 28.0 to 31.0 Kg-cm/cm$^2$, and by using such an ABS resin, a thermoplastic resin composition having good pearly luster and excellent mechanical strength such as a high impact resistance and bending strength is obtained. The mixing ratio of the ABS resin with the above-described mixture of PMMA and the AS resin is about 50 to 10% by weight to about 50 to 90% by weight, preferably about 40 to 20% by weight to about 60 to 80% by weight.

The term "ABS resin" is used herein to describe a butadiene polymer having acrylonitrile and a styrenic monomer graft-polymerized thereto or a mixture of a butadiene polymer and an acrylonitrile-styrene copolymer and further includes a resin composition containing more than about 65% by weight of the graft polymer or the polymer mixture. Thus, as the ABS resin used in the invention, blends of materials such as ABS/AS, ABS/PVC, ABS/polyurethane, etc. can also be used in this invention, e.g., with the AS, polyvinyl chloride, polyurethane, etc. component being present in an amount of about 35% or less. In this case, the ABS resin preferably has a butadiene content of about 5% by weight, in particular, about 4.7 to 6.3% by weight.

Moreover, an even more preferred resin composition of this invention can be obtained by adding glass fibers and additionally the ABS resin to the above-described mixture of PMMA and the AS resin.

Japanese Patent Publication No. 12,174/'73 discloses a process of producing moldings of a thermoplastic resin having an opalescent pattern by molding an insufficiently kneaded mixture of three kinds of resin components using a plunger-type injection molding machine and such a molding technique is applicable to the resin composition of this invention. That is, when a mixture of PMMA and the AS resin or a mixture of PMMA, the AS resin, and the ABS resin in a pellet form is directly molded using a plunger-type injection molding machine at a temperature of from about 180° C to about 250° C or alternatively a mixture of the above described two or three kinds of resin components in a molten condition at about 180° to about 250° C is molded using a mix injection molding machine in which the resin mixture is simultaneously or intermittently injected into a metallic mold through separate nozzles, a pearly luster appears at the contact portion of the AS resin and PMMA in the molten conditions and the molded article is, as a whole, provided with an opalescent mottled pattern. In this case, by using pellets of the kneaded mixture of the AS resin and PMMA having a pearly luster and pellets of the AS resin and/or PMMA, a molded article having a superior opalescent pattern is obtained. Suitable molding techniques and devices which can be used with the thermoplastic resin composition of this invention are described in E. G. Fisher, *Plastics*, 16, 171, London, (June, 1951).

The AS resin, PMMA, and/or the ABS resin as well as the pellets of the kneaded mixture of the AS resin and PMMA or the kneaded mixture of the AS resin, PMMA, and the ABS resin used for the above described molding procedures can be translucent or can be uncolored, monocolored or multi-colored by using a combination of the resin components or the resin pellets colored different colors, and molded articles having a wide variety of surface patterns can be obtained. The colorants which can be used are selected based upon the resins used. The colorants employed can be added to the resins before or after the blending. Suitable examples of colorants which can be used are described in *Plastics Handbook*, 7th Edition, p.578–579, Asakura Publishing Co., Ltd., Japan (1967).

In addition, glass fibers are ordinarily added to the resin mixture using a blender when the AS resin and PMMA are mixed although their addition order is not limited to the above mode.

The invention will be explained more specifically by reference to the following examples. These examples are intended to illustrate the present invention and are not to be construed as limiting the present invention. In the examples, all parts, percentages, and ratios are by weight unless otherwise indicated.

EXAMPLE 1

A commercially available AS resin (acrylonitrile-styrene copolymer) as shown in Table 1 was mixed with a commercially available PMMA (polymethyl methacrylate) as shown in Table 2 in the mixing ratio as shown in Table 3 using a drum blender and then the mixture was melt-molded at a temperature of 200° C. using a screw-type injection molding machine to provide a plate of a size of 0.2 × 4 × 6 cm³. From the appearance of the plate thus prepared the pearly luster effect was measured, and the results obtained are shown in Table 3.

Table 1

| AS resin | Melt Flow Rate (g/10 min.)* | Acrylonitrile Content (%) |
|---|---|---|
| AS - A | 3.1 | 28 |
| AS - B | 2.8 | 24 |
| AS - C | 5.8 | 26 |
| AS - D | 2.5 | 31 |

*Measurement conditions:
ASTM D-1238
Load: 2,160 g
Temperature: 230° C

Table 2

| PMMA | Melt Flow Rate (g/10 min.)* |
|---|---|
| PMMA - a | 4.2 |
| PMMA - b | 0.73 |
| PMMA - c | 7.3 |
| PMMA - d | 3.6 |

*Same as in Table 1.

Table 3

Figure 2:
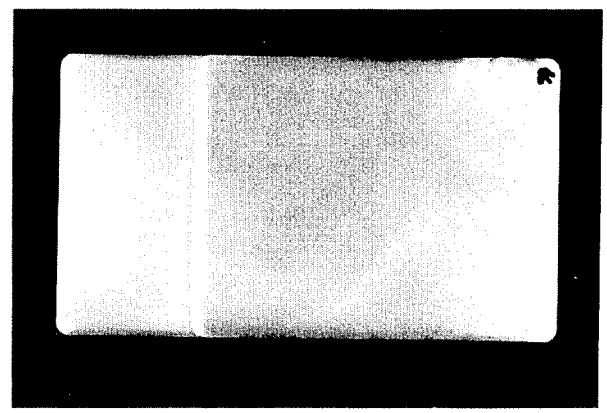
Figure 3:
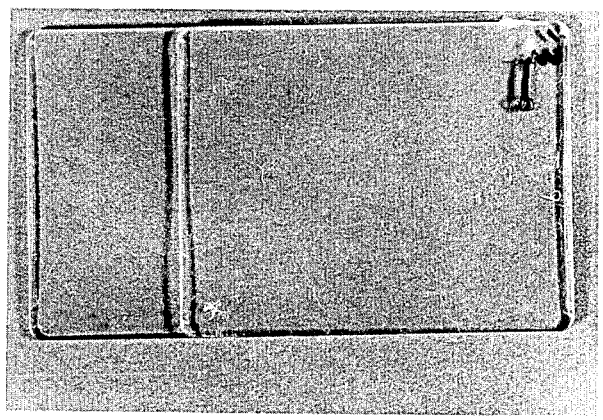

| Run No. | AS Resin | PMMA | Weight Ratio (AS resin: PMMA) | Pearly Luster | Note |
|---|---|---|---|---|---|
| 1 | AS - A | PMMA - a | 90 : 10 | D | No pearly effect (Fig. 1) |
| 2 | AS - A | PMMA - a | 80 : 20 | C | |
| 3 | AS - A | PMMA - a | 70 : 30 | B | |
| 4 | AS - A | PMMA - a | 60 : 40 | A | |
| 5 | AS - A | PMMA - a | 50 : 50 | A | (Fig. 2) |
| 6 | AS - A | PMMA - a | 40 : 60 | A | |
| 7 | AS - A | PMMA - a | 30 : 70 | B - A | |
| 8 | AS - A | PMMA - a | 20 : 80 | C | |
| 9 | AS - A | PMMA - a | 10 : 90 | C | |
| 10 | AS - B | PMMA - a | 50 : 50 | B | |
| 11 | AS - B | PMMA - b | 50 : 50 | D | Transparent (Fig. 3) |
| 12 | AS - B | PMMA - c | 50 : 50 | D | Transparent |
| 13 | AS - C | PMMA - d | 50 : 50 | A | |
| 14 | AS - D | PMMA - d | 50 : 50 | A | |
| 15 | AS - D | PMMA - c | 50 : 50 | B | |
| 16 | AS - A | PMMA - b | 50 : 50 | C | |
| 17 | AS - A | PMMA - c | 50 : 50 | A | |
| 18 | AS - A | PMMA - d | 50 : 50 | A | |

The grades for the pearly luster evaluation in the above table were as follows
A: Excellent pearly luster
B: Pearly luster observed
C: Slightly poor in pearly luster
D: No pearly luster.

EXAMPLE 2

The AS resin designated "AS-A" in Table 1 was mixed with the PMMA designated "PMMA-a" in Table 2 in a mixing ratio of 40 : 60 and after adding glass fibers having a mean fiber length of about 6 to 25 mm and a mean fiber diameter of about 9 to 16 μ to the mixture in the ratio as shown in Table 4 followed by mixing using a drum blender, the resultant mixture was melt-molded at a temperature of 230° C using a screw-type injection molding machine to provide a plate of a size of 0.2 × 4 × 6 cm³ and a dish of a size of 1 × 3 × 5 cm³. From the appearance of the molded articles, the pearly effect was evaluated and the results obtained are shown in Table 4.

Table 4

Figure 4:
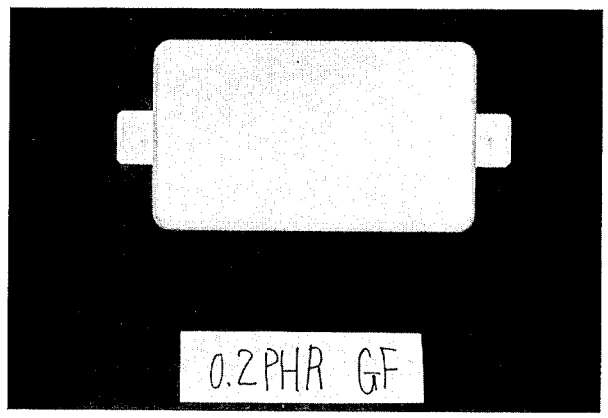
FIGS. 4, 5, and 6 show the effects of adding glass fibers by varying the addition ratios of the glass fibers.
Figure 5:
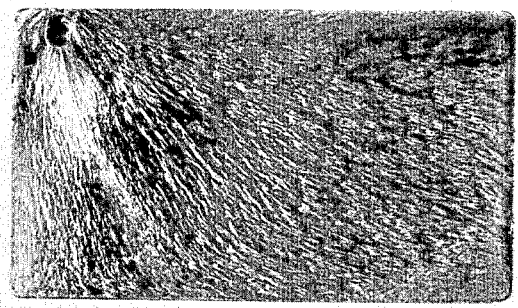
Figure 6:
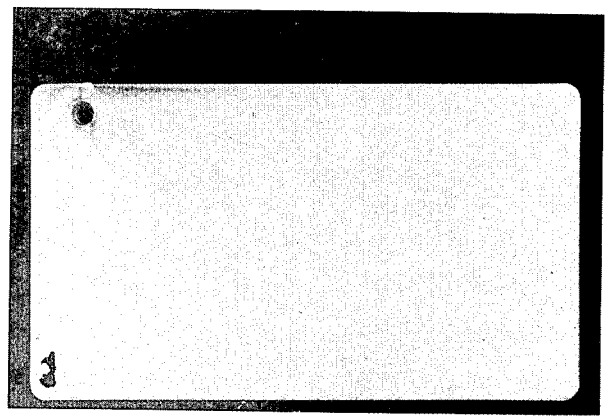

| Run No. | Glass Fiber Content (%) | Pearly Luster | Note |
|---|---|---|---|
| 19 | 0.2 | A | |
| 20 | 0.5 | A | |
| 21 | 1.0 | A | |
| 22 | 2.0 | B | (Fig. 4) |
| 23 | 5.0 | D | (Fig. 5) |
| 24 | 10.0 | D | (Fig. 6) |

The grades for the pearly luster evaluation in the above table were as follows:
A: Excellent pearly luster
B: Pearly luster observed
D: No pearly luster.

EXAMPLE 3

The PMMA, the AS resin, and the ABS resin as shown in Tables 5, 6, and 7 respectively were mixed in the composition ratio as shown in Table 8, the mixture thus prepared was formed into pellets using an extruder, and then injection-molded at a temperature of 220° C using an injection molding machine to provide an ellipsoidal compact container for cosmetic purposes having a major axis of 95 mm and a minor axis of 85 mm. Then, the adaptability of the moldings to cosmetic compact use was evaluated by measuring the Izod impact strength (by ASTM D-256, ¼ inch thick) and the strength (bending pressing speed of 20 mm/min.) of the hinge (thickness of 1.5–2.0 mm) of the cosmetic compact container. The results obtained are shown in Table 8.

Table 5

(Polymethyl methacrylate)

| PMMA | Melt Flow Rate (g/10 min.*) |
|---|---|
| PMMA - a | 4.2 |
| PMMA - b | 0.73 |
| PMMA - c | 7.3 |

*Measurement conditions:
ASTM D-1238,
Load: 2,160 g
Temperature 230° C

Table 6

(AS resin)

| AS Resin | Acrylonitrile Content (%) |
|---|---|
| AS - A | 28 |
| AS - B | 24 |
| AS - C | 26 |
| AS - D | 31 |

Table 7

(ABS resin)

| ABS Resin | Izod Impact Value* (kg-cm/cm²) |
|---|---|
| ABS - X | 7.8 |
| ABS - Y | 20.2 – 21.6 |
| ABS - Z | 28.3 – 31.0 |

*By ASTM D-256

Table 8

| Run No. Comparison Examples | Resin Composition PMMA- | Resin Composition AS- | Resin Composition ABS- | Compounding Ratio PMMA (%) | Compounding Ratio AS (%) | Compounding Ratio ABS (%) | Pearly[1] Luster | Izod Impact[2] Value (Kg.cm/cm²) | Hinge[3] Strength (Kg) | EValuation[4] |
|---|---|---|---|---|---|---|---|---|---|---|
| 1 | b | B | — | 40 | 60 | — | D | 1.9 | 3.5 | X |

Table 8-continued

| Run No. Comparison Examples | Resin Composition PMMA- | AS- | ABS- | Compounding Ratio PMMA (%) | AS (%) | ABS (%) | Pearly[1] Luster | Izod Impact[2] Value (Kg.cm/cm²) | Hinge[3] Strength (Kg) | Evaluation[4] |
|---|---|---|---|---|---|---|---|---|---|---|
| 2 | a | A | — | 40 | 60 | — | A | 1.7 | 3.6 | X |
| 3 | a | A | (nylon) | 40 | 57 | (3) | A | 1.9 | 3.8 | X |
| 4 | b | B | Y | 40 | 30 | 30 | D | — | — | X |
| 5 | b | B | Z | 40 | 30 | 30 | D | — | — | X |

| Run No. Examples of Invention | Resin Composition PMMA- | AS- | ABS- | Compounding Ratio PMMA (%) | AS (%) | ABS (%) | Pearly[1] Luster | Izod Impact[2] Value (Kg.cm/cm²) | Hinge[3] Strength (Kg) | Evaluation[4] |
|---|---|---|---|---|---|---|---|---|---|---|
| 6 | b | A | Y | 40 | 40 | 20 | A | 3.1 | 6.6 | O |
| 7 | b | A | Y | 40 | 30 | 30 | A | 6.1 | 7.2 | O |
| 8 | b | A | Y | 40 | 20 | 40 | A | 11.7 | 7.2 | O |
| 9 | b | A | Y | 25 | 25 | 50 | B | 13.5 | 8.0 | O |
| 10 | b | A | X | 40 | 40 | 20 | A | 1.6 | 5.5 | X |
| 11 | b | A | X | 40 | 30 | 30 | A | 2.6 | 5.9 | X |
| 12 | b | A | X | 40 | 20 | 40 | A | 3.6 | 6.2 | O |
| 13 | a | A | X | 25 | 25 | 50 | B | 4.7 | 6.9 | O |
| 14 | b | A | Z | 45 | 45 | 10 | A | 2.2 | 5.4 | X |
| 15 | b | A | Z | 40 | 40 | 20 | A | 2.8 | 6.6 | O |
| 16 | b | A | Z | 40 | 30 | 30 | A | 5.0 | 7.4 | O |
| 17 | b | A | Z | 40 | 20 | 40 | A | 6.2 | 6.5 | O |
| 18 | b | A | Z | 25 | 25 | 50 | B | 8.3 | 6.4 | O |
| 19 | b | D | Z | 40 | 30 | 30 | A | 6.3 | 7.5 | O |
| 20 | b | C | Z | 40 | 30 | 30 | A | 6.2 | 7.6 | O |
| 21 | c | A | Z | 40 | 30 | 30 | A | 5.1 | 7.5 | O |

Note:
[1] Pearly luster evaluation grades
A: Excellent pearly luster
B: Pearly luster observed
D: No pearly luster
[2] Izod impact value:
The value of a test piece having a thickness of 1/4 inch measured by ASTM D-256.
[3] Hinge strength:
The compact was opened, a force was applied to the hinge portion at a pressing rate of 20 mm/min supporting at the points separated by intervals of 10 mm, and the strength of the hinge portion when the hinge was broken was measured. In addition, the measurement of the strength was carried out using a compression tester, "Autograph IS-2000" made by Shimazu Seisaku Sho.
[4] Hinge evaluation shown in Table 8 was as follows:
O: Practically usable (a hinge strength of higher than 6 kg)
X: Practically unusable (a hinge strength of lower than 6 kg).

As shown by the results in Table 8, the resin compositions of about 50 to 10% by weight of the ABS resin and about 50 to 90% by weight of a mixture of about 30 to 70% by weight of polymethyl methacrylate and about 70 to 30% by weight of the styrene-acrylonitrile copolymer having an acrylonitrile content of about 25 to 32% by weight had a good pearly luster and in particular moldings having an Izod impact value of higher than about 2.8 kg-cm/cm² could be used satisfactorily as the hinge for a compact from the standpoint of hinge strength.

While the invention has been described in detail and with reference to specific embodiments thereof, it will be apparent to one skilled in the art that various changes and modifications can be made therein without departing from the spirit and scope thereof.

What is claimed is:

1. A thermoplastic resin composition having a pearly luster consisting of about 30 to 70% by weight of polymethyl metachrylate and about 70 to 30% by weight of a styrene-acrylonitrile copolymer having an acrylonitrile content of about 25 to 32% by weight.

2. A thermoplastic resin composition having a plearly luster and an Izod impact value of about 2.8 to 14 kg-cm/cm² consisting of (a) about 50 to 90% by weight of a thermoplastic resin compositon consisting of about 30 to 70% by weight of polymethyl methacrylate and about 70 to 30% by weight of styrene-acrylonitrile copolymer having an acrylonitrile content of about 25 to 32% by weight and (b) about 50 to 10% by weight of an acrylonitrile-butadiene-styrene resin.

3. The thermoplastic resin composition as claimed in claim 1, wherein said polymethyl methacrylate has a melt flow rate of about 0.7 to 7.3 g/10 min as measured according to ASTM D 1238 using a load of 2,160 g and at a temperature of 230° C.

4. The thermoplastic resin composition as claimed in claim 1, wherein said thermoplastic resin composition additionally contains glass fibers in an amount of about 0.05 to 2.0% by weight to the total weight of said resin composition.

5. The thermoplastic resin composition as claimed in claim 1, wherein said glass fibers have a mean fiber length of about 6 to 25 mm and a mean fiber diameter of about 9 to 16 microns.

6. The thermoplastic resin composition as claimed in claim 2, wherein said resin composition additionally contains glass fibers in an amount of about 0.05 to 2.0% by weight to the total weight of said resin composition.

7. The thermoplastic resin composition as claimed in claim 6, wherein said glass fibers have a mean fiber length of about 6 to 25 mm and a mean fiber diameter of about 9 to 16 microns.

* * * * *